June 20, 1950
A. D. HOFFMANN
2,512,156
DELAY MEANS
Filed March 1, 1946
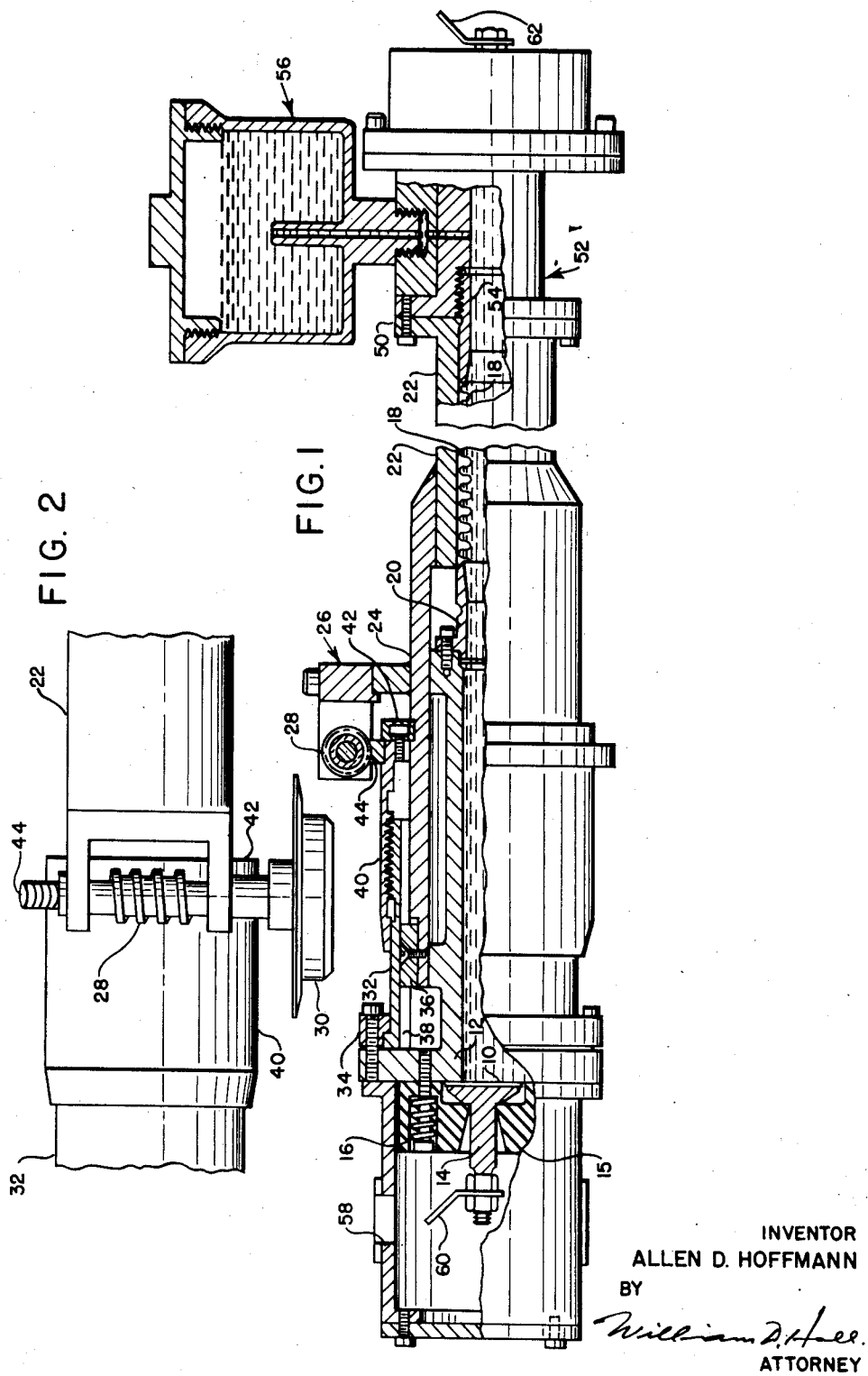
INVENTOR
ALLEN D. HOFFMANN
BY
William D. Hall
ATTORNEY Patented June 20, 1950

2,512,156

UNITED STATES PATENT OFFICE 2,512,156

DELAY MEANS

Allen D. Hoffmann, Seattle, Wash., assignor, by mesne assignments, to the United States of America as represented by the Secretary of War Application March 1, 1946, Serial No. 651,306

3 Claims. (Cl. 178—44)

This invention relates to delay means and more particularly to variable supersonic delay lines.

Supersonic delay lines are employed where a signal is to be delayed for a relatively long time, for example, several hundred microseconds. A transmitting piezoelectric crystal is immersed at one end of a liquid column usually a mercury column. The crystal is electrically excited by the signal to be delayed thus causing the crystal to mechanically vibrate. These mechanical vibrations travel down the liquid column and impinge upon a piezoelectric receiving crystal. Stresses are set up in the receiving crystal which in turn cause a potential to appear between the two faces of the crystal that is representative of the signal originally applied to the transmitting crystal.

The delay encountered by a signal in passing through is a function of the velocity at which a signal is propagated in the liquid column and also of the length of the liquid column. The velocity of propagation of the signal in the liquid is not easily changed since it involves changing the temperature or the density of the liquid medium. In order to make a line having a variable time delay it is therefore necessary to vary the length of the signal path in the liquid medium.

It is an object of this invention, therefore, to provide a novel delay line wherein the delay of signals passing therethrough is easily adjusted.

It is a further object of this invention to provide a novel method of adjusting the length of a liquid column separating two piezoelectric crystals.

For a better understanding of the invention together with other and further objects thereof reference is had to the following description taken in connection with the accompanying drawing in which:

Fig. 1 is a side elevation, taken partially in section, of the preferred embodiment of this invention; and Fig. 2 is a plan view of a portion of the embodiment shown in Fig. 1.

In Fig. 1 of the drawing there is shown a piezoelectric crystal 10 held in place against tubular structure 12 by means of a clamping block 14. Clamping block 14 is held against crystal 10 under the tension of helical springs which communicate with block 14 through an insulating member 15. One of the springs denoted by numeral 16 is shown in Fig. 1. The crystal 10 is pressed against tubular structure 12 firmly enough to form a liquid tight seal therebetween. The means herein shown for mounting the crystal is only one of many that may be employed and therefore it is not intended that the invention should be limited to that structure shown in Fig. 1 but rather it is intended that this invention embrace all structures accomplishing substantially the same results as the structure herein described.

Tubular structure 12 is mechanically connected to a Sylphon or extensible bellows 18 by means of a coupling 20 shown in Fig. 1 as a separate structure attached to structure 12 by screws or bolts but which may, in other embodiments of the invention, form an integral part of structure 12. Sylphon 18 is supported within a pipe 22 which is preferably mechanically rigid but not necessarily liquid tight. Rigidly attached to pipe 22 is a fixed sleeve 24 on which is mounted by means of a supporting structure 26, a worm gear 28 and a rotating knob 30. A movable sleeve 32 making a sliding fit with the exterior surface of fixed sleeve 24 is rigidly attached to tubular structure 12 in this embodiment by a clamping ring 34.

Tubular structure 12 makes a sliding fit on the interior surface of fixed sleeve 24 so that the entire structure including sleeve 32 and tubular structure 12 will slide smoothly over sleeve 24 without looseness or side play. A key 36 rigidly fastened to sleeve 24 engages a slot or key way 38 in sleeve 32 to prevent rotation between sleeve 32 and sleeve 24. A rotating band 40 internally threaded at one end engages external threads on sleeve 32. A collar 42 rigidly fastened to band 40 in this case by screws or bolts, and extending into a groove in the outer surface of sleeve 24 provides a bearing for band 40. Collar 42 prevents axial movement between band 40 and sleeve 24 but at the same time allows rotational movement of band 40. A worm wheel 44 is rigidly fastened to rotating band 40 so that it engages worm gear 28.

The length of Sylphon 18 and pipe 22 is selected so that the desired delay in signals is obtained. Pipe 22 is provided with a flange 50, said flange being bolted to an end unit 52. A coupling 54, threaded to fit an internally threaded opening in end unit 52 in a liquid tight seal, is rigidly fastened to Sylphon 18 so as to make a seal that is also liquid tight. A piezoelectric crystal (not shown) is located at the end of the axial opening in end structure 52 and is supported in substantially the same manner that crystal 10 is supported. A liquid transmitting medium is introduced into the space between crystal 10 and the corresponding crystal at the other end of the line. For the sake of clarity in the drawing this liquid is not shown in the space between the crystals. A liquid reservoir 56 is mounted on end unit 52 and communicates with the space between the crystals by means of an opening formed in the side wall of unit 52.

Electrical connections may be made to the two faces of each crystal by connecting one terminal to structure 12 or any other unit making electrical connection thereto. Opening 58 is shown to illustrate a point where a conventional coaxial connector might conveniently be located. The connector is not shown. A connection to structure 12 will be a common connection to the two near faces of the two crystals and normally will be a ground connection. The two crystals may be electrically isolated if desired by using a nonconducting liquid medium and providing insulating mounts for the crystals but this is not usually necessary or desirable. Connection to the remaining face of crystal 10 may be made at terminal 60 while a connection to the remaining face of the other crystal may be made at terminal 62.

In operation the signal to be delayed is applied between terminal 60 and ground. If the signal to be delayed is a video or similar signal, it is preferable to modulate a carrier frequency with this signal and then apply the modulated signal to crystal 10. A carrier frequency of 10 to 30 megacycles has been found to give satisfactory results in most applications. The mechanical oscillations of crystal 10 causes compressional waves to travel down the liquid column enclosed within Sylphon 18 until they impinge upon the second piezoelectric crystal and set up stresses therein. These stresses cause a signal to appear between terminal 62 and the common or ground terminal that is substantially similar to the signal applied to crystal 10. If the faces of crystal 10 and the corresponding crystal at the other end of the liquid column are oriented at right angles to the axis of Sylphon 22 very little disturbance of the signal will be caused by the corrugated walls of Sylphon 18 due to the highly directive characteristics of the compressional wave transmitted from the crystals. The transmitting impedance of the crystals is preferably matched to the acoustic impedance of the liquid column in all cases where it is desirable that the transmitting crystal transfer a maximum amount of energy to the liquid column and where the receiving crystal is to absorb a maximum amount of energy from the liquid column and also where the receiving crystal is to cause minimum reflection of the incident signals. In cases where multiple reflections are desired the crystals may be intentionally mismatched. A finite delay will occur between the time a signal is applied to terminal 60 and the time that the same signal appears at terminal 62. If this delay is other than that desired, as will be indicated by the circuit in which this delay line is used, knob 30 is rotated causing the rotation of band 40 through the action of worm gear 28 and worm wheel 44. The rotation of band 40 causes axial movement of sleeve 32 which in turn causes axial movement of tubular structure 12. The movement of tubular structure 12 increases or decreases the spacing between the transmitting crystal 10 and the receiving crystal depending on which direction knob 30 is rotated. This change in spacing will, of course, change the delay that a signal undergoes in passing through this line. Knob 30 or rotating band 40 may be calibrated to indicate the delay of the line.

Increasing the spacing between the crystals increases the volume of the liquid column. Liquid will flow from reservoir 56 into Sylphon 18 to compensate for this change in volume and conversely liquid will be forced from Sylphon 18 into reservoir 56 when the spacing between the crystals is decreased. The delay line may be supported by clamps or brackets attaching to pipe 22.

The advantages of this system are thought to be obvious. The liquid column is inclosed in an extensible metal Sylphon so that no liquid tight sliding joints are required; the length control mechanism is so arranged that micrometer adjustment of the spacing between crystals may easily be made; the liquid reservoir provides means for maintaining the liquid column completely full at all times and the delay line is compact and relatively easy to mount.

While there has been described what is at present considered the preferred embodiment of the invention, it will be obvious to those skilled in the art that various changes and modifications may be made therein without departing from the invention.

What is claimed is:

1. A liquid delay line comprising a tubular supporting structure, a first and a second piezoelectric crystal, said first crystal being oriented with at least one face thereof perpendicular to the axis of said tubular supporting structure with said face of said crystal effectively closing the end of said supporting structure in a liquid tight seal, an extensible metal Sylphon making a sliding fit with the interior of said supporting structure, means for attaching one end of said Sylphon to said supporting structure in a liquid tight seal at a point near the end of said structure closed by said first crystal, a sleeve structure adapted to make a sliding fit on the end of said supporting structure not closed by said first crystal, means for attaching the remaining end of said Sylphon to one end of said sleeve structure in a liquid tight seal, means for closing the remaining end of said sleeve structure with said second crystal so as to form a liquid tight seal therebetween, the face of said crystal closing said opening being oriented substantially perpendicular to the axes of said sleeve structure and said supporting structure, means for preventing relative rotation of said sleeve structure and said supporting structure, an internally threaded band fixed axially with respect to said supporting structure but free to rotate about the axis of said structure, said band engaging a threaded portion of said sleeve structure, means for rotating said band comprising a worm wheel and a worm gear rigidly attached to said band and said supporting structure respectively and each engaging the other, a liquid reservoir communicating with the space enclosed within said Sylphon and said two crystals, a liquid medium completely filling the space within said Sylphon and between said crystals and at least partially filling said liquid reservoir, means for applying an electrical signal to or receiving an electrical signal from each of said crystals and means for rotating said worm gear whereby said worm wheel, said rotating band, and said sleeve structure cooperate to vary the physical spacing between said first and second crystals and, thereby, vary the delay suffered by a signal passing through said delay line.

2. A delay type transmission means comprising an extensible bellows, a first and a second piezoelectric crystal, means for forming a liquid tight seal at either end of said bellows, means for supporting said bellows and said crystals so that the near faces of said crystals are parallel to each other and perpendicular to the axis of said bellows, means for introducing a liquid transmitting medium into said bellows and means for maintaining a constant level of the liquid within said bellows, means for applying signal to or receiving a signal from each of said crystals and means for varying the length of said bellows whereby the delay suffered by a signal passing through said transmission means is also varied.

3. A compressional-wave delay line comprising a hollow sealed container, a portion of said container being elastic to permit changes in the length thereof, means to maintain said container completely filled with liquid at all times, and compressional-wave signal transducer means supported in said container to induce and respond to compressional waves in said liquid.

ALLEN D. HOFFMANN.

REFERENCES CITED

The following references are of record in the file of this patent:

UNITED STATES PATENTS

| Number | Name | Date |
| --- | --- | --- |
| 2,383,343 | Ryan | Aug. 21, 1945 |
| 2,404,226 | Gurewitsch | July 16, 1946 |
| 2,407,294 | Shockley et al. | Sept. 10, 1946 |
| 2,416,337 | Mason | Feb. 25, 1947 |

FOREIGN PATENTS

| Number | Country | Date |
| --- | --- | --- |
| 227,788 | Great Britain | Jan. 1, 1926 |